No. 890,016. PATENTED JUNE 9, 1908.
F. L. BRYANT.
BALL BEARING AXLE.
APPLICATION FILED APR. 8, 1907.
2 SHEETS—SHEET 1.
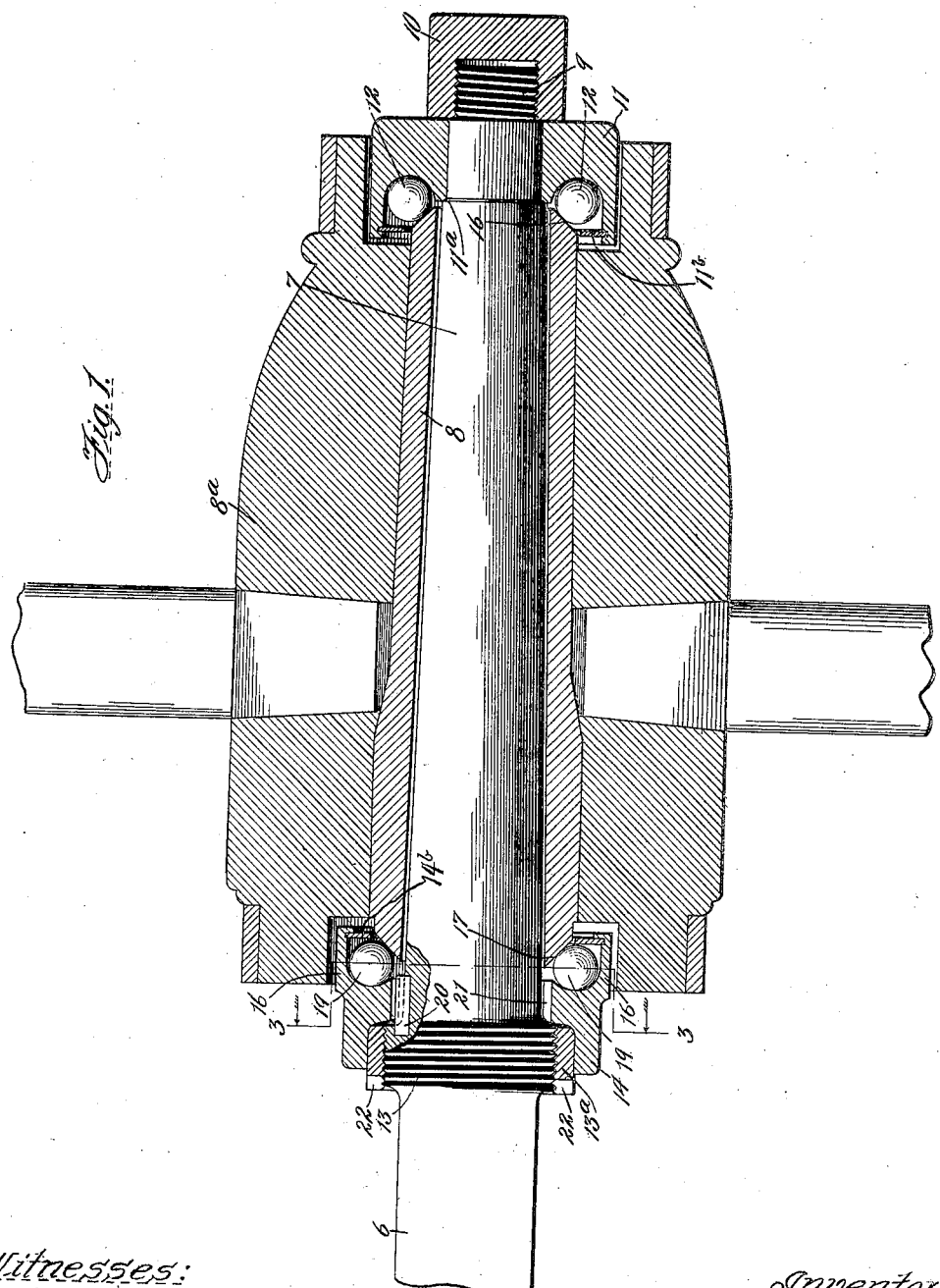

No. 890,016. PATENTED JUNE 9, 1908.
F. L. BRYANT.
BALL BEARING AXLE.
APPLICATION FILED APR. 8, 1907.
2 SHEETS—SHEET 2.
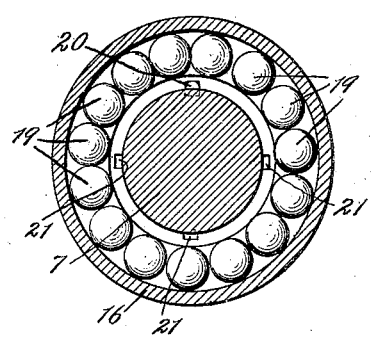
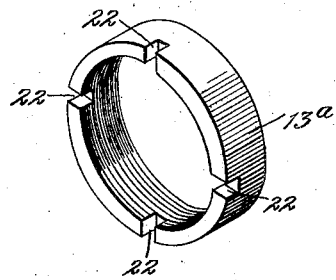
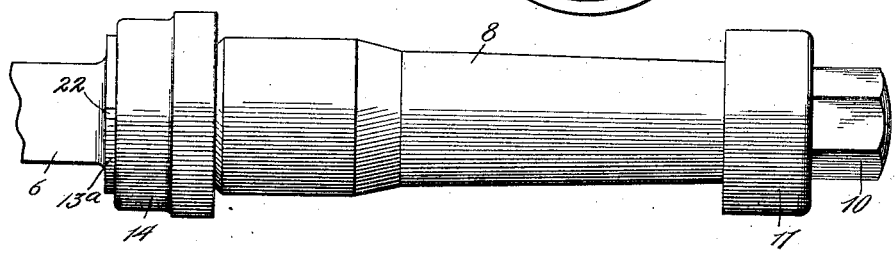
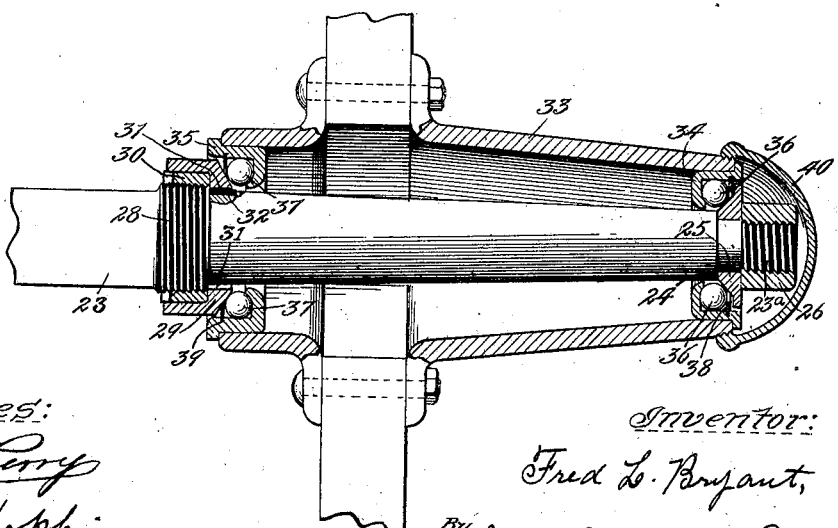
Witnesses:
Inventor:
Fred L. Bryant,
By Jones, Addington & Ames
Attys.

UNITED STATES PATENT OFFICE.

FRED L. BRYANT, OF CHICAGO, ILLINOIS.

BALL-BEARING AXLE.

No. 890,016.

Specification of Letters Patent.

Patented June 9, 1908.

Application filed April 8, 1907. Serial No. 367,086.

*To all whom it may concern:*

Be it known that I, FRED L. BRYANT, a citizen of the United States, residing at Chicago, in the county of Cook and State of Illinois, have invented new and useful Improvements in Ball-Bearing Axles, of which the following is a full, clear, concise, and exact description, reference being had to the accompanying drawing, forming part of this specification.

This invention relates to improvements in ball bearing axles, the principal object of the invention being the production of a device of this class in which improved means are provided for adjusting the ball-bearing members on the axle so as to secure the proper amount of play between the parts.

Another object of the invention is to produce a device of this class having superior means for permitting adjustment of the non-rotating ball-bearing members on the axle so as to distribute the wear on these parts, and for preventing rotation of these parts.

In the accompanying drawings, in which I have shown an embodiment of my invention, Figure 1 shows in elevation one end of an axle, and in longitudinal section the other parts of a form of device embodying my invention, combined with the hub of a wheel;
Fig. 2 is an elevational view of the device without the wheels; Fig. 3 is a cross-sectional view taken on the line 3—3 of Fig. 1, looking in the direction indicated by the arrows; Fig. 4 is a perspective view of an adjusting screw-threaded collar used in my device; Fig. 5 is a face view of one of the ball cups with the balls removed; and Fig. 6 is a view similar to Fig. 1 but showing a modified form of device embodying the features of my invention.

Referring particularly to Figs. 1 to 5 inclusive, 6 is the axle which is provided with a tapering portion 7 surrounding which is an axle-box 8, the latter being driven firmly into the hub of the wheel 8ª. At the extreme outer end of the axle is a screw-threaded part 9, adapted to receive a screw-threaded nut 10. A ball-cup 11 is adapted to be held in position between the nut 10 and a shoulder 11ª formed on the axle 6 near its end. Within the cup 10 is a series of hardened steel balls 12. The axle 6 is provided also with an enlarged exteriorly-screw-threaded portion 13 and between this portion 13 and the cup 11 is a second cup 14 arranged facing the cup 11. The axle box 8 has formed upon its ends inclines or cones 16 and 17, the balls 12 in the cup 11 running on the cone 16 at one end of this box, while the balls 19 in the cup 14 run on the cone 17 upon the opposite end of the box. To adjust the parts so that there will be only just sufficient play between the balls and the coned ends of the box 8 to permit the same to turn freely, a screw-threaded collar 13ª on the threaded portion 13, is screwed outward or toward the end of the axle until this adjustment is secured. To prevent the balls in the cups 11 and 14 from falling out, when these cups are disassembled from the other parts, retaining rings 11ᵇ and 14ᵇ are provided, as is well known in this art.

Heretofore in devices of this class it has been customary to locate the means for taking up slack in the bearings at the outer end of the axle and to arrange the ball-bearing member which is farthest from the end of the axle fixedly on the axle. Various means have been resorted to to prevent the member at the outer end of the axle from being rotated by contact with the hub of the wheel, and thereby tightening or loosening the adjusting means and consequently losing the adjustment. This difficulty I overcome by fixing the ball-bearing member at the outer end of the axle securely on the axle after the wheel is in place, and then adjusting the other ball-bearing member toward or away from the fixed member. In the case of the device illustrated in Figs. 1 to 5 inclusive, I arrange on the axle 6, adjacent the enlarged portion 13, a projecting pin 20 adapted to fit into any one of a series of notches 21 on the inner side of the cup 14. By this means the cup 14 is permitted to move toward and away from the other cup 11 when the screw-threaded collar 13ª is adjusted toward or away from the end of the shaft. These notches may be as many in number as desired—preferably four or more—so that the cup may be turned to a number of different positions, whereby a more even wearing is secured.

The collar 13ª is provided with means for engagement with a wrench to be used in turning this collar. Such means may consist of a series of notches 22, adapted to receive the ends of a spanner wrench of well known form. In putting on and adjusting the wheel and bearings, the steps will be as follows: the collar 13ª will first be passed on over the end of the axle and will be screwed onto the enlarged screw-threaded portion 13.

The cup 14 will then be slipped on with the pin 20 lying in one of the notches 21. The wheel with the box 8 carried thereby will next be passed on over the end of the axle, when its larger cone 17 will engage the balls 19 in the cup 14. The cup 11 will then be placed in position with its balls 12 in contact with the cone 16. The nut 10 will next be placed on the screw-threaded end 9 of the axle and will be screwed down firmly in place so as to force the cup 11 into engagement with the shoulder 11ᵃ on the axle, thus preventing the same from turning. After the parts are thus put in place, the collar 13ᵃ will then be screwed outward or toward the end of the axle until the proper adjustment is secured and the wheel rotates freely, but without excess of lateral movement. To prevent excessive wear upon the cup 11 at one side, this cup may be turned to a new position from time to time by simply loosening the nut 10, giving the cup a partial rotation, and tightening the nut again. It will be seen that the adjustment of the parts may be very closely made, as the collar 13ᵃ may be given as small a part of a complete turn as is desired, it being unnecessary to turn this collar to a determinate position, as is true of the adjusting means in earlier devices of this kind.

In the form of the device shown in Fig. 6, the principle of operation employed in the above described embodiment of my invention is employed, but the locations of the cones and cups are reversed, the cups in this case being carried by the wheel and rotating therewith, while the cones are arranged on the axle and do not rotate. In this form of the device 23 is the axle, which is provided at its outer end with a screw-threaded portion 23ᵃ, of reduced diameter, and a shoulder 24 near the threaded portion 23ᵃ. The cone 25 is provided with a central opening and is adapted to be slipped onto the end of the axle 23 and to be held in contact with the shoulder 24 by the threaded nut 26 which is screwed onto the threaded portion 23ᵃ. The axle 23 is formed with a screw-threaded enlargement 28. A second cone 29 is sleeved on the axle 23 and is adapted to be moved toward the cone 25 by the rotation of the collar 30 which surrounds the enlarged portion 28 and has screw-threaded engagement therewith. This cone 29 is formed with a series of recesses 31 of which there may be any desired number but preferably four or more. The axle 23 is provided with a pin 32 which forms a spline adapted to fit into any one of the recesses 31 in the cone 29, whereby this cone 29 is prevented from rotating on the axle but is permitted to move on said axle longitudinally thereof. The hollow metallic hub 33 of the wheel has, secured in each of its ends, a ball-cup, these ball-cups being designated 34 and 35. A series of balls 36 is confined in the cup 34 and engages the cone 25, while a second series of balls 37 is confined in the cup 35 and engages the longitudinally-adjustable cone 29. To prevent these balls 36 and 37 from falling out of the cups 34 and 35 when said cups are disassembled from the other parts of the device there is provided in each of these cups a retaining ring, these rings being designated 38 and 39. A cap or cover 40 is adapted to be screwed onto the outer end of the hub 33 to conceal the inclosed parts as well as to exclude dust and the like.

It will be observed that in the two forms in which I have shown my invention embodied, I employ, in combination with an axle and wheel, ball-bearing members carried by the wheel, and corresponding ball-bearing members carried by the axle, the ball-bearing member which is arranged on the axle nearest the outer end of said axle being fixed, while the other ball-bearing member on the axle is adapted to be adjusted along the axle toward and away from said fixed ball-bearing member.

My invention comprises also the means herein described for preventing rotation of the longitudinally-adjustable ball-bearing member, while permitting the necessary longitudinal movement of this part during adjustment.

Having thus described my invention what I claim as new and desire to secure by Letters Patent is:

1. The combination with a wheel of an axle, a ball-bearing member fixed on the outer end of said axle, a longitudinally-movable but non-rotatable ball-bearing member arranged on said axle facing said fixed ball-bearing member and farther from the end of the axle, a collar threaded on said axle and disposed within a recess in said longitudinally movable member, a series of balls running on each of said ball-bearing members, and corresponding ball-bearing members carried by the wheel and rotating therewith.

2. The combination with an axle and wheel, of a ball-bearing member fixed on said axle near its outer end, a second ball-bearing member arranged on said axle facing said fixed ball-bearing member and farther from the end of the axle; a collar having threaded engagement with said axle and being disposed in a recess in said second ball bearing member, whereby the same may be adjusted toward and away from said fixed ball-bearing member, corresponding ball-bearing members carried by the wheel, and a series of anti-friction balls between each of the ball-bearing members on the wheel and the corresponding ball bearing members on the axle.

3. The combination with a wheel and axle, of a pair of ball-bearing members carried by the wheel, a pair of corresponding ball-bearing members non-rotatably arranged on the axle, one of said last-named ball-bearing members being fixed on the axle toward its outer end, the other of said members being located farther from the end of the axle and longitudinally movable on the axle, a collar threaded on said axle and engaging in a recess in said longitudinally-movable member, means for preventing rotation of said member on the axle, said means comprising a projection on one of the parts and a corresponding recess formed in the other of said parts, and a series of anti-friction balls engaging with said ball bearing members.

4. The combination with a wheel and axle, of ball-bearing members carried by the wheel and rotating therewith, a non-rotating ball-bearing member arranged on said axle near the outer end thereof, means adapted to have screw-threaded engagement with said axle and to retain said non-rotating ball-bearing member in fixed position on the axle, another ball-bearing member arranged on the axle facing said non-rotating ball-bearing member, a collar having threaded engagement with said axle and adapted to engage said last-named ball-bearing member and to hold the same in adjusted position, and suitable anti-friction balls.

5. The combination with a wheel and axle, of rotating ball-bearing members carried by the wheel, non-rotating ball-bearing members carried by the axle, one of said non-rotating members being fixed on the axle nearer its outer end, the other being longitudinally-movable on said axle, farther from its end, a screw-threaded collar disposed on said axle and engaging in a recess in said longitudinally-movable member for adjusting the same toward and away from said fixed member, and suitable anti-friction balls.

6. The combination with a wheel and axle, of rotating ball-bearing members carried by said wheel, corresponding non-rotatable ball-bearing members on the axle, one of which non-rotating members is fixed on the axle near the outer end of the latter, and the other of which is adjustable on the axle longitudinally thereof, the axle having an enlargement adjacent said longitudinally-adjustable member, a collar arranged on said enlargement and having screw-threaded engagement therewith and adapted, by being turned, to adjust said longitudinally-movable member toward and away from said fixed member, and suitable anti-friction balls.

7. The combination with a wheel and an axle having a shoulder near its outer end, of a ball bearing member adapted to be fixed on the axle against said shoulder, a second ball bearing member arranged on said axle facing said fixed ball-bearing member and farther from the end of the axle and provided with a recess, a spline on the axle adapted to enter said recess whereby said member is prevented from turning on the axle, and means for adjusting said second-named ball-bearing member toward and away from said first-named ball-bearing member and adapted to retain said second-named ball-bearing member in adjusted position, and suitable anti-friction balls.

8. The combination of an axle having a screw-thread upon its outer end, a ball-bearing member adapted to be passed on to the end of said axle, means adapted to be screwed on to the screw-threaded portion of said axle and thereby retain said ball-bearing member in fixed position on said axle, a second ball-bearing member arranged on said shaft and adapted to be moved toward and away from said fixed ball-bearing member in adjustment, means for preventing the rotation of the said second-named ball-bearing member, said means comprising a projection on one of said parts and a corresponding recess in the other of said parts, screw-threaded means of said axle for retaining said longitudinally-adjustable ball-bearing member in adjusted position, ball-bearing members carried by the wheel and adapted to coöperate with the ball bearing members on the axle, and suitable anti-friction balls.

9. The combination with a wheel, of an axle, a ball-bearing member on said axle near the outer end thereof, a second ball-bearing member located inward from the first ball bearing member and arranged on said axle so as to face said first-named ball-bearing member and adapted to be adjusted longitudinally of said axle, a collar having screw-threaded engagement with the axle and being disposed in a recess in said second-named ball-bearing member for adjusting the same toward and away from said first-named ball-bearing member, ball-bearing members carried by the wheel and rotating therewith adjacent each of said ball-bearing members on the axle, and a series of balls confined between each of the ball-bearing members on the axle and the corresponding ball-bearing member carried by the wheel.

10. The combination with a wheel, of an axle having a shoulder near the outer end thereof a ball-bearing member non-rotatably secured upon said axle against said shoulder, a second ball-bearing member arranged on said axle farther from the end of the axle and facing said first-named ball-bearing member and so arranged as to be non-rotatable but to have longitudinal movement toward and away from said first-named ball-bearing member, rotating ball-bearing members carried by the wheel adjacent said non-rotating ball-bearing members, screw-threaded means on said axle for adjusting said second-named ball-bearing member toward and away from said first-named ball-bearing member, and suitable anti-friction balls.

11. The combination with an axle, of a cup secured upon the outer end of said axle, a series of balls in said cup, a second cup facing said first-named cup and farther from the end of the axle, a series of balls in said second-named cup, means on said axle for adjusting said second-named cup toward and away from first-named cup, an axle box surrounding said axle, and means for preventing rotation of said second cup, but adapted to permit movement of said cup toward and away from said first-named cup in adjustment.

12. The combination with an axle, of a rotating axle-box having a cone at each of its ends, ball-bearing members adjacent each of said cones, suitable anti-friction balls between said cones and said ball bearing members means for securing the outer of said ball-bearing members to the axle, the inner of said ball-bearing members being adjustable lengthwise of said axle, and means for preventing rotation of said last-named member.

In witness whereof, I have hereunto subscribed my name in the presence of two witnesses.

FRED L. BRYANT.

Witnesses:
M. R. ROCHFORD,
C. L. HOPKINS.